Jan. 26, 1932.   B. HALL   1,843,083
TRANSMISSION MECHANISM
Original Filed April 5, 1924   3 Sheets-Sheet 1
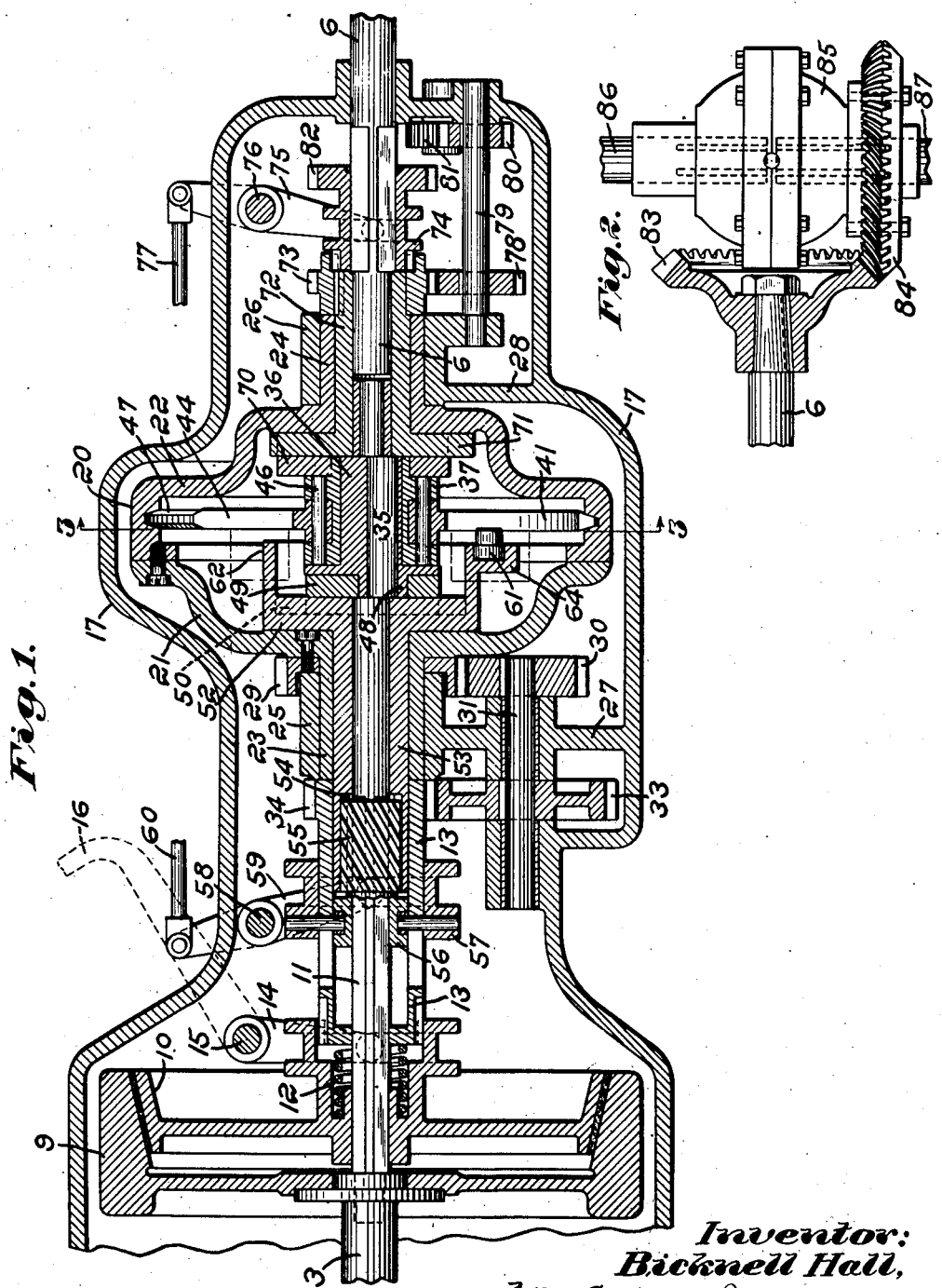
Inventor:
Bicknell Hall,
by Emery, Booth, Janney & Varney
Attys.

Inventor:
Bicknell Hall,
by
Emery, Booth, Janney+Varney Attys.

Jan. 26, 1932.　　　B. HALL　　　1,843,083
TRANSMISSION MECHANISM
Original Filed April 5, 1924　　3 Sheets-Sheet 3
Fig. 5.
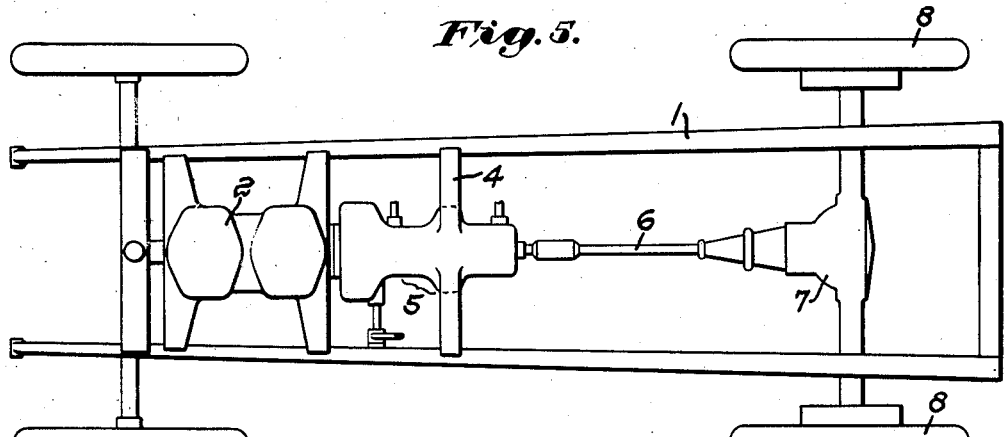
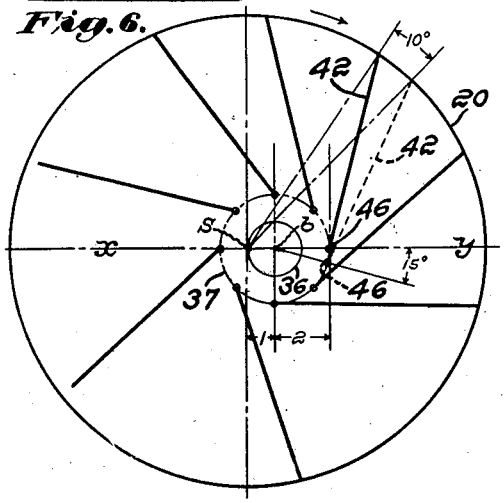
Fig. 6.
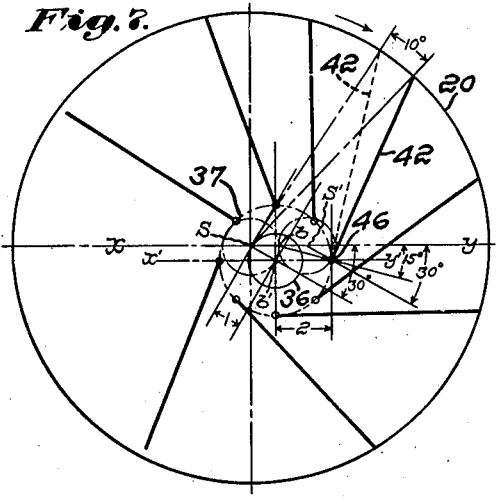
Fig. 7.
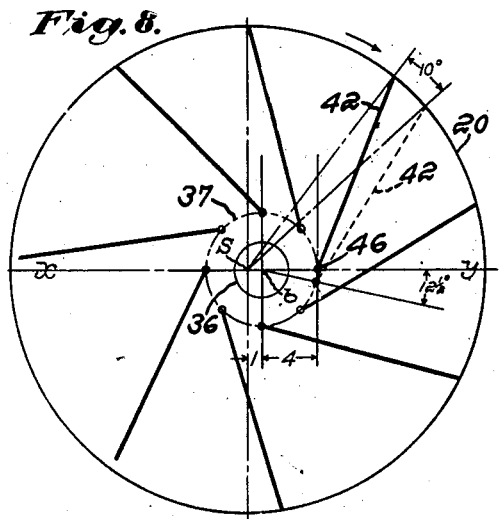
Fig. 8.
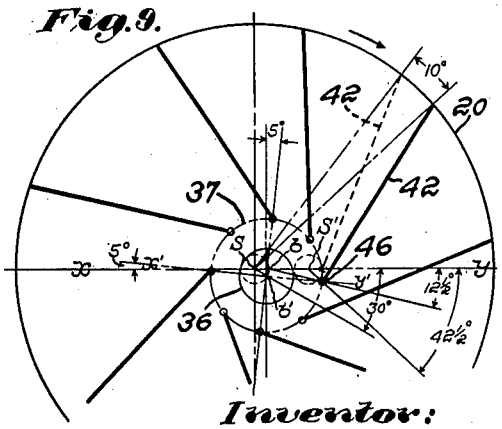
Fig. 9.
Inventor:
Bicknell Hall,
by Emery, Booth, Janney & Varney
Attys.

Patented Jan. 26, 1932

1,843,083

UNITED STATES PATENT OFFICE

BICKNELL HALL, OF ATLANTIC, MASSACHUSETTS, ASSIGNOR TO HALL CO., OF BOSTON, MASSACHUSETTS, A CORPORATION OF MASSACHUSETTS

TRANSMISSION MECHANISM

Application filed April 5, 1924, Serial No. 704,408. Renewed November 25, 1929.

My invention aims to provide an improved mechanism for positively transmitting power of varying speeds, said mechanism being adapted for general use but here shown in connection with motor vehicles, with which latter it is particularly useful.

In the accompanying drawings, illustrating one form of my invention as applied to motor vehicles, Fig. 1 is a longitudinal vertical section taken centrally through the transmission mechanism;

Fig. 2 is a view partially in plan and partially in horizontal section of the differential and rear axle mechanism;

Fig. 5 is a plan view upon a smaller scale of the chassis of an automobile embodying the present form of my invention;

Figs. 6, 7, 8 and 9 are diagrams illustrating certain operating features of the transmission mechanism.

Figure 3:
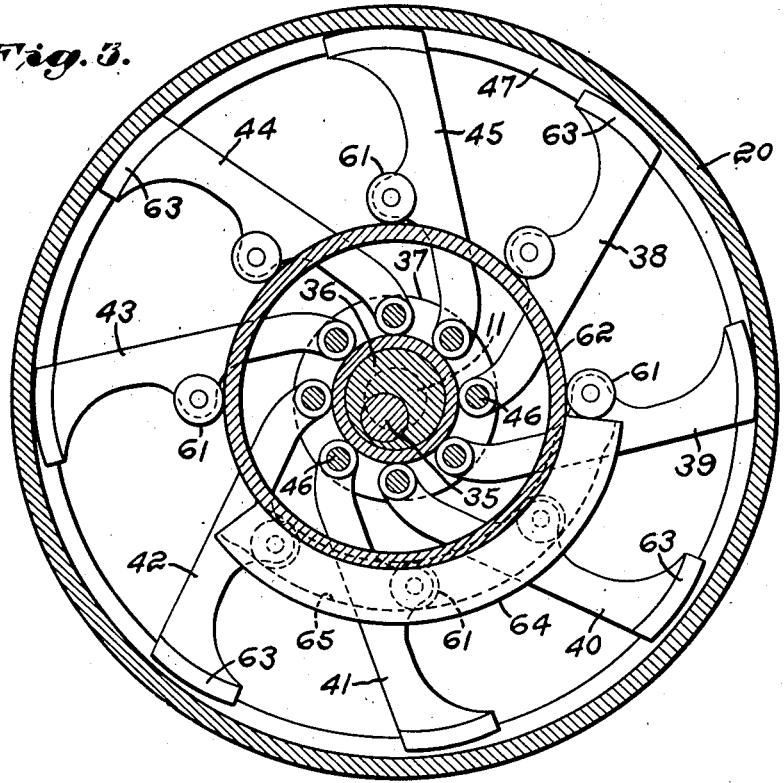
Fig. 3 is a transverse vertical section upon the line 3—3 of Fig. 1.

Referring now to Fig. 5 I have there shown the chassis of a motor vehicle including a frame 1 upon which is mounted a motor 2 which may be an internal combustion or other engine having a crank, or engine shaft 3 (see Fig. 1). The chassis also comprises a suitable cross member 4 upon which is supporting the rear portion of the transmission mechanism, the latter indicated as a whole at 5. Said chassis includes also the tail or propeller shaft 6, the differential and rear axle assembly 7, and the propelling wheels 8, 8.

Viewing Fig. 1, the rear end of the engine shaft 3 has mounted thereon the usual fly wheel 9 the rear face of which forms one element of a clutch here shown as of the cone type although any other suitable type may be employed. The mating element of said clutch is indicatd at 10, the latter being slidable but non-rotatable upon a squared portion of the clutch or drive shaft 11, the latter having a bearing in the rear end of said engine shaft. Said clutch element 10 is normally held in forward or clutching position by a spring 12 surrounding the clutch shaft and bearing at its opposite ends respectively against said clutch element 10 and against the forward end of a sleeve 13.

Any suitable mechanism may be employed for operating the clutch, such as the yoke 14 having its lower end loosely seated in an annular groove formed upon the hub of said clutch element 10 and fulcrumed at 15. A clutch lever 16 is provided for moving said yoke to disengage the clutch, said lever preferably being operatively connected to a pedal or the like conveniently positioned for the operator of the motor vehicle.

The transmission mechanism as a whole together with said clutch mechanism is preferably enclosed within a suitable casing 17 which for convenience in assembling is desirably divided horizontally to form a base portion and a removable cover.

Referring still to Fig. 1 the variable speed transmission proper comprises an annular drum-like element 20 herein including the opposed heads 21, 22 each formed axially with oppositely extending hubs 23, 24 whereby said annular element is supported for rotation within suitable bearings 25, 26 carried by brackets 27, 28 projecting upwardly from the base portion of the casing 17. Secured to the outer face of the head member 21 of said annular element is a gear 29 meshing with a pinion 30 fast upon one end of a short shaft 31 rotatable in a bearing formed in said bracket 27 and in the casing 17. Said shaft 31 also has fast upon it a toothed gear 33 which in turn meshes with a pinion 34 formed upon the inner or right end, viewing Fig. 1, of the sleeve 13.

The clutch shaft 11 is extended rearwardly to a position adjacent the forward end of the propeller shaft 6, passing through the annular element 20. Within the latter said clutch shaft is formed with an eccentric portion 35 upon which is loosely and eccentrically mounted an adjustable bearing member 36 hereinafter referred to as the adjustable eccentric or the adjustable bearing. The latter forms a bearing for a ring-like element 100

37 which may be termed the driven element of the transmission mechanism.

Figure 4:
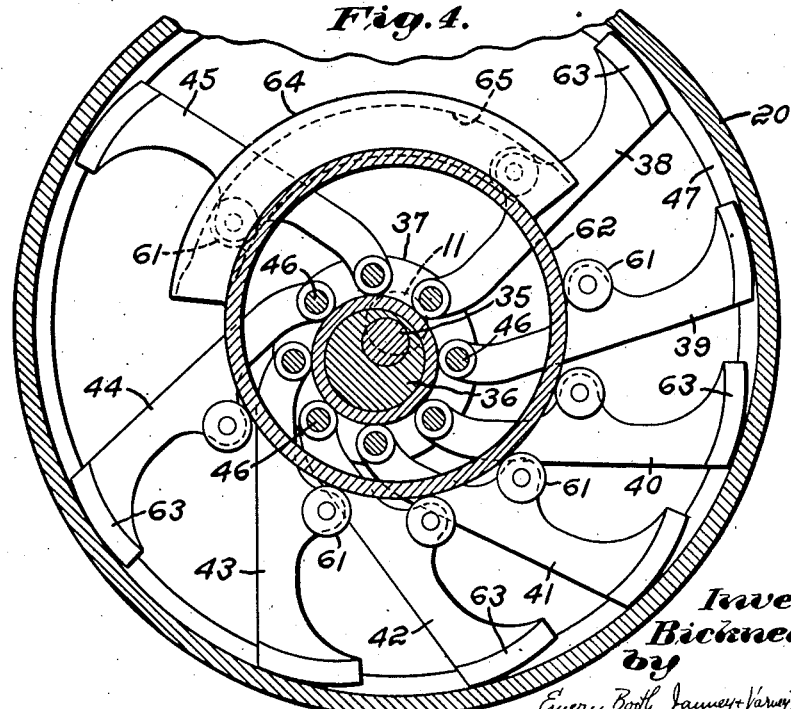
Fig. 4 is a view similar to Fig. 3 but with certain of the parts in an eccentric position of adjustment.

Intermediate the drum-like annular element 20 and said driven element or ring 37 is a circumferential series of driving units or arms best seen in Figs. 3 and 4. Said units are herein eight in number, designated as 38 to 45 respectively, and are as indicated at 46 pivotally connected at one of their ends with one of said elements, herein the driven element. At their opposite ends said driving units are adapted to make contact either continuously or progressively, with the other of said elements, herein the inner surface 47 of the annular element 20, the nature of said contact, whether continuous or progressive, being determined by the adjusted position of said adjustable eccentric.

As shown in Figs. 1 and 3 the driving units and driven element are in their position of concentricity with said annular element, at which time the eccentricity of the eccentric portion 35 of the clutch shaft with respect to said clutch shaft, and the eccentricity of the adjustable eccentric 36 with respect to said eccentric portion 35 are opposite and offset each other. Since two such eccentricities are equal the axes of the adjustable eccentric 36 and of the driven element will be coincident with that of the annular element 20 as in Fig. 3. It will be apparent that by turning said adjustable eccentric on and about the eccentric portion 35 of the clutch shaft said eccentric will be moved into eccentricity relative to the clutch shaft and the annular element, the extent of said eccentricity depending upon the angle through which said eccentric is turned, increasing to a maximum as shown in Fig. 4 at 180°.

Suitable mechanism is provided for so adjusting said eccentric, which for the purpose, see Fig. 1, is herein provided with a squared hub 48 which receives a unison ring 49 or so-called Oldham coupling. Said unison ring has upon its opposite faces diametral grooves extending at right angles to each other and which slidably receive respectively said squared hub 48 and a rib 50 seen in dotted lines in Fig. 1 and formed on a plate 52 carried at the inner end of a sleeve 53 which loosely surrounds the clutch shaft. At its left end, viewing Fig. 1, said sleeve 53 is formed internally with spiral threads 54 which cooperate with a corresponding spiral 55 slidable but non-rotatable upon said squared portion of the clutch shaft.

Means is herein provided for moving said spiral longitudinally of the clutch shaft thereby to impart turning movement to the sleeve 53 to adjust the eccentric 36 transversely. Said spiral is accordingly provided with a collar 56 connected as by pins to an outer collar 57 slidably mounted upon the sleeve 13, the latter being formed with longitudinal slots for the passage of said pins. For moving said outer collar 57 there is provided a lever pivotally supported at 58 and having at one end a yoke portion 59 loosely seated in an annular groove formed in said outer collar and at its outer end connected with a rod 60. Said rod is desirably operatively connected to a suitable lever or the like positioned convenient to the hand of the operator of the motor vehicle.

As best seen in Figs. 3 and 4, each driving unit 38 to 45 is guided in its travel by means of a laterally projecting roller 61 which contacts with an annular guide surface 62 concentric with the annular element 20 and herein formed upon a flange on the plate 52. The radius of said guide surface is such that the latter contains the respective centers from which the arcuate heads 63 of the driving units are struck, thereby permitting each driving unit to swing about the point of contact of its roller 61 with the guide surface and also providing that the head of any unit when in driving contact with the surface 47 of the annular element may partake of a rolling action thereon.

The annular element 20, driven element 37 and the series of driving units 38—45 as so far described are similar in their construction and relation to the corresponding elements shown in the copending application of Hall and Hathaway, Serial No. 666,912, filed October 6, 1923. The angle between a line drawn from the center of said annular element to the point of contact thereon of a unit which is driving and a line drawn from said point of contact to the point of pivotal attachment of said unit, as in said copending application, is within the angle of repose whereby positive driving action is obtained. In said application the driven element is caused to rotate through the medium of the driving units cooperating with the surrounding annular element, the speed of rotation of the driven element being equal to that of the annular element when concentric therewith and increasing above said speed as said driven element is adjusted eccentrically, the increase in speed being proportional to the eccentricity. To provide speeds below that of the driving element, and down to zero if desired, there is here provided a construction differing from that of said copending application.

In accordance with the present invention, while the driven element is rotated by and in unison with the driving element 20 when said elements are concentric, means is herein provided whereby subsequent relative eccentric adjustment of their axes reduces the speed imparted to the driven element, the reduction increasing with the increased eccentricity until the resulting speed becomes zero, if desired. For this purpose I propose to gyrate the adjustable eccentric 36 coincidently with the rotation of the annular driving element 20 and herein in the same direction. In the copending application referred to, the eccentrically adjustable member remains stationary. In the present instance, however, said adjustable eccentric is itself adapted to be gyrated about the center of the main shaft. Said gyration is effected in the construction shown, see Fig. 1, through the clutch shaft 11, spirals 55, 54, sleeve 53, plate 52 and unison ring 49 whereby said eccentric is gyrated in a circular path of variable radius at the same speed at which the clutch shaft rotates.

The effect of so gyrating the adjustable eccentric in the same direction in which the annular element is rotating is to neutralize or subtract from the rotary motion which would otherwise be imparted to the driven ring 37 by the driving units, the neutralizing or offsetting action increasing as the eccentricity is increased. When said adjustable eccentric and the driven element are concentric with the annular element there is of course no gyration of said eccentric which then merely rotates idly within the ring and produces no effect upon its speed; at such time said driven element, driving units and annular element all rotate together as a unit and with no relative movement between them. But when the adjustable eccentric is moved off center from the clutch shaft, however slightly, the driving units impart rotation to the driven element about its own center at a speed differing from that of the annular element. Were the adjustable eccentric to remain stationary after being so eccentrically adjusted this difference in speed would be an increase as in said copending application. With the mechanism shown, however, the gyratory movement given to it causes the driving units to be moved ahead at their inner ends at the same time and in the same direction as the movement which would be imparted to them from the annular element were the eccentric stationary.

Obviously if the adjustable eccentric and driven element carried thereby are moved bodily in the direction of the thrust which would otherwise be imparted to the effective driving unit or units from the annular element 20, by an amount equal to such thrust movement of said unit or units, the latter can transmit no thrust to the driven element which would be effective to turn it on its own center. Said driven element accordingly will not be rotated upon its axis. If however such bodily or gyratory movement of the driven element is less than the driving or thrust movement of the driving units, said driven element will receive an effective thrust from said units and will be rotated to an extent equivalent to the difference between said movements. When the elements are concentric the gyration becomes zero and the driven element will rotate as a unit with the annular member.

The above described operation of the transmission mechanism will be best understood by reference to the diagrammatic Figures 6 to 9. Referring first to Figs. 6 and 7, the annular driving element 20 is represented by the large outer circle 20, the axis of said element and of the clutch or drive shaft being indicated at $s$. The adjustable eccentric 36, represented by the small full line circle 36, is assumed to be in its adjusted position of greatest eccentricity, the center of said bearing being indicated by the letter $b$. The clutch shaft has been assumed to be in such angular position that said center $b$ lies to the right of the center $s$ and upon the horizontal line $x$—$y$ passing through it. The driven element or ring 37 loosely carried by said adjustable eccentric is represented by the intermediate full line circle 37. The adjusted positions of the parts as indicated are such that the pivotal points 46 of the driving units are distributed about said ring 37 at radial distances from its center equal to twice the eccentricity of the adjustable eccentric 36. That is, if the distance from the main center $s$ to the center of said bearing $b$, which may be termed the radius of eccentricity, is one inch, the distance from said center $b$ to the pivot point 46 of each driving unit, which may be termed the crank radius, is two inches.

Referring specifically to Fig. 6, and with the parts positioned as there shown, assume that the annular element 20 is rotating in a clockwise direction, and assume further and purely for the purpose of description that the adjustable eccentric 36 is not gyrated but remains stationary. Under such conditions and with said ratio of two to one between the crank radius and the radius of eccentricity, the driven element or ring 37 will receive a rotation upon its own center at a speed one half greater than that of the annular driving element 20. For example, if said annular element is rotated through 10° the driven ring 37 will be rotated at a 50% increased speed, or in other words will be rotated about its own center through 15° while the annular element rotates 10°. In Fig. 6 the driving unit 42 is the arm which is temporarily functioning as a driver, its point of pivotal attachment 46 being farthest removed in a radial line from the main center $s$. Assuming therefore, as stated, that the adjustable eccentric 36 remains stationary the pivot point 46 of said driving unit 42 will be moved in a clockwise direction 15° about the center $b$ while the annular element 20 is travelling 10° in the same direction. The position in which said arm would then lie is indicated in Fig. 6 by the dotted line 42.

Assume now that the adjustable eccentric 36 instead of remaining stationary is being gyrated about the center $s$ of the main shaft in a clockwise direction, as is provided for by the construction shown in Figs. 1 to 4. Referring to Fig. 7 the gyratory path of movement of the center $b$ is indicated by the small dotted line circle upon the center $s$ while the parallel path of gyratory movement of the pivot point 46 is indicated by the dotted line circle upon the center $s'$.

In Fig. 7 the adjustable eccentric 36, ring 37 and driving unit 42 are shown in the positions which they would occupy after the eccentric has been gyrated through 30° from the position shown in Fig. 6, the new position of said driving unit 42 being indicated in full lines while its position formerly occupied in Fig. 6 is indicated by the dotted line 42. In both Figs. 6 and 7 the distance between the points of contact upon the annular element of the dotted line arm 42 and the full line arm 42 is 10°, indicating that said element has rotated through 10°. In Fig. 7 the previous or starting position of the center $b$ is indicated at $b$, while its new position is indicated at $b'$. It will now be noted that the arc of 15° about the center $b$ through which the point 46 travelled under the assumptions of the preceding paragraph is equal to an arc of 30° about the center $s'$. Therefore if the adjustable eccentric and the ring 37 are gyrated at such speed that said center $b$ describes an arc of 30° about the center $s$ while the annular element 20 is travelling 10°, the pivot point 46 will be carried through substantially the same path and in the same direction as it would be moved were the eccentric 36 to remain stationary and the annular element similarly rotated through 10°. In other words, while said center $b$ has moved through an arc of 30° about the center $s$, due to the gyration, the point 46 has moved through an arc of 15° with respect to the former center $b$. A line $x'-y'$ drawn through the center $b'$ and through the point 46 is horizontal and parallel with the line $x-y$ which contains the positions previously occupied by said points in Fig. 6. Thus it is apparent that no rotation has been imparted to the ring 37 about its own center during the rotary movement of 10° of the annular element and the gyratory movement of 30° of the bearing and ring. The result is that any parts operatively connected to the ring 37 so as to be rotated with it will remain at rest.

From the above description of the diagrammatic Figs. 6 and 7 it is seen that, with the stated ratio of two to one between the crank radius and the radius of eccentricity, by gyrating the adjustable eccentric and the driven ring through 30° while the annular element is rotating through 10° the driving effect of said annular element is neutralized and no rotational movement is imparted to said ring. If therefore said eccentric is gyrated about the center of the clutch shaft at three times the speed of rotation of the annular element the desired zero speed will result. Referring to Fig. 1 said ratio of three to one between the rotary speed of the annular element 20 and the gyratory movement of the adjustable eccentric 36 is provided for by means of the gears 29, 30, 33, 34 intermediate said annular element and the clutch shaft and so designed as to afford a reduction of one-third. The adjustable eccentric 36 is accordingly gyrated directly by the clutch shaft at the speed of the latter and therefore at three times the rotary speed applied to the annular element 20. When therefore said eccentric has been adjusted into its position of maximum eccentricity, such as shown in Fig. 4, and equal to one-half the crank radius, no rotation is imparted to the driven element 37 about its own center.

Referring to Fig. 3 in which adjustable eccentric is in its position of maximum eccentricity, as in Figs. 6 and 7, and is being gyrated as previously described it will be observed that the driving units 38, 45 which are pivoted upon said ring at points approximately diametrically opposite the point of pivotal connection of the driving unit 42 would be active as drivers, at the side of the annular element 20 opposite the unit 42, if permitted so to act. Said arms 38, 45 would rotate the ring 37 in a counterclockwise direction, that is in the direction reverse to the rotation which would be produced by the driving unit 42 if the adjustable eccentric were stationary instead of gyrating.

To prevent such counterdriving action of those units 38, 45 which are pivoted upon that portion of the ring which is then nearest the center of the clutch or drive shaft, suitable means is provided for moving or withdrawing them from driving contact with the inner surface 47 of the annular element 20. At one portion of the guide surface 62 is provided a cam 64 preferably integral with the flange of said plate 52 and formed upon its inner or right face, Fig. 1, with an arcuate cam groove 65 of a width to receive the rollers 61. As clearly shown by the dotted lines in Figs. 3 and 4 said cam groove is concentric with the guide surface 62 but its center line has a radius somewhat less than the distance radially of the annular element from the axis of a roller to the outer end of its driving unit when in driving position. When the roller of such a driving unit enters said cam groove that unit is swung slightly in a circumferential direction and prevented from making driving contact with the surface 47 of the annular element. Said cam groove being formed on a portion of the plate 52 which is connected to the adjustable eccentric 36 through the unison ring 49 remains always in the same angular relation to said eccentric and accordingly is always in position to engage and withdraw from action the desired driving units.

From the consideration of Figs. 6 and 7 it has been shown that with the adjustable eccentric 36 in its position of maximum eccentricity as in said figures, and as also shown in Fig. 4, the resulting rotational movement of the driven element 37 is zero. It is also understood that with the annular element 20 and the driven element in concentric position, as shown in Fig. 3, said elements rotate as a unit, the adjustable eccentric then being in concentricity with said elements and merely rotating idly within the driven element. With the adjustable eccentric in any adjusted position intermediate said two extremes of concentricity and maximum eccentricity the driven element or ring 37 will be rotated upon its own axis at a speed less than that of the annular element 20, the decrease in speed being proportional to the extent of the eccentricity.

This will be understood from an inspection of the diagrammatic Figs. 8 and 9. In said figures the various parts are designated by the same reference characters as are the corresponding parts in Figs. 6 and 7. In Figs. 8 and 9, however, the adjustable eccentric 36 has been shifted to carry its center off from the center $s$ of the clutch shaft and of the annular element to only one-half the full extent. The crank radius, that is the distance from the pivot points of the driving units to the center of the ring 37, of course remains the same and in Figs. 8 and 9 is therefore four times the radius of eccentricity as indicated by the numerals 1, 4 at the lower central portion of Fig. 8.

Referring particularly to Fig. 8, assume that the annular element 20 is being rotated in a clockwise direction and also assume, as was previously done in first considering Fig. 6, that the adjustable eccentric 36 is not being gyrated but remains stationary. In that case and with the ratio between the crank radius and the radius of eccentricity equal to 4 to 1 the ring 37 would be caused to rotate upon its own axis at a speed one-fourth greater than that of the annular element. For example, if said annular element is rotated through 10° the driven ring 37 will be rotated about its own center through 12½°, an increase of 25%. The position which the active driving unit 42 would then assume is indicated by the dotted line numbered 42, its pivot point 46 having been moved 12½° about the center $b$.

Turning now to Fig. 9 assume that the adjustable eccentric 36 does not remain stationary but is being gyrated about the main center $s$, as in Fig. 7. The path of gyratory movement of the center $b$ is indicated by the small dotted line circle upon the center $s$, while the parallel path of gyratory movement of the pivot point 46 of the arm 42 is indicated by the small dotted line circle upon the center $s'$. The new positions of the various parts are indicated by the full lines, the center of the ring 37 having moved to the point marked $b'$.

It will be seen in Fig. 9 that the angle of 12½° about the center $b$ through which the point 46 was moved in Fig. 8 under the assumptions of the preceding paragraphs is greater than an angle of 30° upon the center $s'$. The gyratory movement of the adjustable eccentric is at the same speed relative to the annular element as before. That is, the center $b$ travels through an angle of 30° in a clockwise direction about the main center $s$ while the annular element rotates 10°. If with the same eccentricity as in Figs. 8 and 9 it were desired to move the adjustable eccentric so as to entirely neutralize the rotation imparted to the ring 37 from the annular element, as was done in Figs. 6 and 7, it would be necessary to gyrate said adjustable bearing at a greater speed relative to that of the annular element; the center $b$ would have to be moved through more than 30° about the main center $s$ while the annular element is traveling 10°.

Or conversely stated, the ratio between the crank radius and the radius of eccentricity being 4 to 1, if it is desired to offset entirely the effect upon the ring 37 due to the rotation of the annular element the point 46 should rotate about the center $b$ only one-fourth of the angle through which the center $b$ is gyrated about the center $s$, which in the diagrammatic Fig. 9 would be 7½°. But in the present construction it has been seen that said point 46 rotates 12½° during a 10° rotation of the annular element, assuming the adjustable eccentric to remain stationary, as in Fig. 8. Therefore said point 46 upon the ring 37 receives a forward angular movement about the center $b$ equal to the difference between 12½° and 7½°, or 5°.

Thus the driven ring 37 has been rotated upon its own center through an angle of 5° while the annular element 20 was rotating 10°, the resulting speed of said driven ring being therefore 50% of that of the annular or driving element. This is readily apparent from the fact that the line $x'$—$y'$, Fig. 9, through the point 46 and the center $b'$ makes an angle of 5° with the horizontal line $x$—$y$. The same angle of 5° is also indicated at the upper central portion of Fig. 9.

If the adjustable eccentric were moved still farther off center and beyond one half of the possible adjustment shown in Figs. 8 and 9 the driven ring would be rotated at a still further and proportionately decreased speed relative to that of the annular element. On the other hand, starting with the position of the eccentric as shown in Fig. 9, if said eccentric is moved toward the main center the speed of the driven ring 37 is increased, approaching proportionately that of the annular element and finally becoming equal thereto when the adjustable eccentric is on center. In this manner any speed from that of the driving element 20 down to zero may be obtained for the driven element.

It will be understood that while I have herein shown means for gyrating the eccentric in the same direction in which the driving element rotates thereby to obtain reduced speeds, I may, by employment of reversing means of conventional type and such incidental mechanical changes as might be necessary to permit the reverse operation, gyrate the eccentric in a reverse direction to that in which the driving element rotates with the result that speeds in excess of the driving element might be obtained, the excess, as in the construction shown, varying in proportion to the extent of eccentricity and rate of gyration. If it be desired to obtain variations of speed from that of the driving element upward, such reverse gyration would alone be sufficient, just as the mechanism here shown is sufficient where variations downward alone are desired. By employing the direct drive here shown and the conventional reverse referred to, variations in speed both upward and downward could be had at will, and a range of speeds from zero to the maximum above that of the driving element could be had.

Referring to Fig. 1, power is taken off the driven element or ring 37 in any suitable manner, said ring herein being connected through a unison ring 70, similar to the unison ring 49 previously described, with a plate 71 formed at the inner end of a sleeve 72 loosely supported within the right hub 24 of the annular element 20. The rear end of the clutch shaft is loosely supported within said sleeve, as is also the forward end of the propeller shaft 6. The rear or right end of said sleeve 72 has fast upon it a driving gear 73 which may be operatively connected to the propeller shaft to turn the latter in one or the opposite direction.

For forward driving said gear 73 is formed upon its right face with radial, internal lugs adapted to be engaged by similar external lugs upon a slidable sleeve 74 mounted upon a squared portion of the propeller shaft so as to rotate with it. Said slidable sleeve 74 may be moved longitudinally upon the propeller shaft as by means of the lever 75 pivotally supported at 76 and having at its lower end a member loosely engaged in an external annular groove upon said sleeve. Said lever has connected at its other end an operating rod 77 extended through any suitable connections to a position convenient to the operator.

In Fig. 1 said sleeve 74 is shown in its left hand position, in engagement with the driving gear 73, power then being applied directly to the propeller shaft from said gear through said sleeve. For reverse driving I have provided a train of reverse gearing herein including the pinion 78 fast upon a jack shaft 79 rotatably supported in suitable bearings in the casing 17. Said jack shaft also has fixed upon it a pinion 80 constantly in mesh with a similar pinion 81 pivoted upon the rear wall of the casing. The sleeve 74 has formed upon or secured to its rear end a reverse gear 82 which is adapted to mesh with said pinion 81 when the sleeve 74 is shifted to its extreme rear or right position, in which case the drive will be from the sleeve 72 through the driving gear 73, pinions 78, 79, 80 through the reverse gear 82 to the slidable sleeve 74 upon the propeller shaft. In an intermediate position of said sleeve a neutral position is obtainable in which the propeller shaft will remain at rest irrespective of whether the clutch 10 is or is not engaged.

Power is transmitted through the propeller shaft 6 to the propelling wheels 8, 8 through suitable differential mechanism similar to that customarily employed but in which the gear ratio may be very much lower than at present obtainable. In most motor vehicles the differential mechanism is constructed to afford a gear reduction of about four to one between the propeller shaft and the rear axle. This necessitates the employment of a large ring gear upon the differential housing and a relatively small pinion upon the rear end of the propeller shaft.

By my invention this gear ratio may be reduced, if desired, to one to one, or even reversed so as to provide an increased instead of a reduced ratio for the differential mechanism. This is due to the fact that the propeller shaft is driven at a lower speed than the clutch and engine shaft. As herein disclosed there is a three to one reduction between the crank shaft and the propeller shaft through the variable speed transmission mechanism. When said mechanism is set to transmit the maximum speed, namely when the adjustable eccentric is concentric, the ring 37 and gear 73 are driven at the same speed as that applied to the annular element 20, namely, one third that of the clutch shaft. In such case the propeller shaft will likewise be driven at one third the speed of the clutch shaft. Accordingly if the gear ratio in the differential is one to one approximately the same speed relative to that of the engine shaft will be applied to the rear axle as is now generally employed in motor vehicles.

Such a differential gearing is shown in Fig. 2 wherein the rear end of the propeller shaft and the central portion of the rear appear in plan. Upon the rear end of the propeller shaft is secured a gear 83 of somewhat larger diameter than ordinarily employed in this connection and which meshes with a similar gear 84 fast upon the differential housing 85. Said gears as shown are of the helical bevel type, but any gears suitable for the purpose may be provided. The other parts of the differential mechanism are similar to those ordinarily employed, the adjacent inner ends of the halves of the rear axle being indicated at 86 and 87 respectively.

From the foregoing description it will be understood that I have provided a universally adjustable positive variable speed transmission mechanism which is adjustable to afford all speeds from zero to the maximum. As herein disclosed said transmission mechanism is directly connected with the customary clutch shaft and occupies in general a position corresponding to that in which the stepped transmission gears are now found in an ordinary motor vehicle. Said mechanism is adapted for use in conjunction with a clutch of any usual type whereby the engine shaft may be entirely disengaged when desired. It will be understood, however, the vehicle may be brought to rest even with said clutch engaged, by adjusting transversely the position of the adjustable eccentric 36 through the medium of the shift lever or the like connected to the operating link 60. The propeller shaft may be driven in either direction at universally variable speeds and the shift from forward to reverse drive may be effected if desired without disengaging the main clutch. At the same time a great reduction in the diameter of the usual large ring gear upon the differential housing is obtained which result has long been sought by those skilled in the art of motor vehicle construction.

It will also be observed that when the transmission mechanism is adjusted for full speed forward operation of the motor vehicle, and therefore during by far the greatest part of the time in which the vehicle is in motion, the adjustable eccentric is then concentric with the clutch shaft and the driving and driven elements and driving units all rotate as a unit and without relative movement, thereby reducing to a minimum any wear of the parts. Also since the reduced speeds are obtained without the use of reduction gearing of any type, the transmission mechanism is substantially noiseless in operation at all speeds.

My invention is not limited to the particular illustrative embodiment thereof herein disclosed.

I claim:

1. Variable speed transmission mechanism of universal adjustability to afford all speeds from zero to maximum, comprising in combination an eccentrically adjustable member, a driven element loose thereon, an annular element surrounding the latter, a circumferential series of driving units connected to said driven element and engageable with said annular element, means for rotating said annular element thereby to impart rotary motion to said driven element at a speed dependent upon the adjusted position of said adjustable member, and means to gyrate said member in any adjusted position of the same, thereby to vary the speed of rotation imparted to said driven elements from the rotating annular element, and in proportion to the extent of eccentricity of said adjustable member.

2. Variable speed transmission mechanism of universal adjustability comprising in combination an annular element, means to rotate the same an element rotatable about an axis adjustable to be concentric or variably eccentric relative to the axis of said annular element, a circumferential series of driving units connected with one of said elements and progressively engageable with the other, and whereby rotation of said annular element will impart rotation to said rotatable element at th same or varied speeds as their axes are concentric or eccentric respectively, and means to gyrate said rotatable member in the same direction in which it is rotated whereby said rotation may be partially or wholly neutralized depending upon the extent of relative eccentricity of the axes of said members thereby to provide any speed of rotation for said rotatable element from that of the annular element to zero.

3. Speed varying mechanism comprising in combination a shaft, a bearing adjustable transversely thereof to be concentric or variably eccentric, a driven element rotatable upon said bearing, an annular element surrounding the axis of said shaft, driving units connected to said rotatable element and operatively engageable progressively with said annular element to transmit rotary movement from the former to the latter, and mechanism bodily to move said bearing to vary said rotary movement to a degree dependent upon the eccentricity of said bearing, the resulting movement transmitted to said driven element being zero when said bearing is in its position of maximum eccentricity.

4. Speed varying mechanism comprising in combination a shaft, a bearing adjustable transversely thereof to be concentric or variably eccentric, a driven element rotatable upon said bearing, an annular element surrounding the axis is of said shaft, driving units connected to said rotatable element and operatively engageable progressively with said annular element to transmit rotary movement from the former to the latter, and mechanism bodily to move said bearing to vary said rotary movement to a degree dependent upon the eccentricity of said bearing, the resulting movement transmitted to said driven element being zero when said bearing is in its position of maximum eccentricity, said driven and annular elements rotating in unison when said bearing is concentric.

5. Speed varying mechanism comprising in combination a shaft, an annular element rotatably connected therewith, a bearing member adjustable eccentrically of said annular element, a driven element concentric and rotatable upon said bearing member, a series of driving units intermediate said annular and driven elements, connected with one and operatively engageable continuously or progressively with the other as said bearing member is concentric or eccentric respectively, said driven element thereby being rotated at the same speed as said annular element when concentric, and connections between said shaft and said bearing member to gyrate the same whereby the speed of rotation of said driven element may be varied to an extent dependent upon the radius of gyration.

6. Speed varying mechanism comprising in combination a shaft, an annular element rotatably connected therewith, a bearing member adjustable eccentrically of said annular element, a driven element concentric and rotatable upon said bearing member, a series of driving units intermediate said annular and driven elements, connected with one and operatively engageable continuously or progressively with the other as said bearing member is concentric or eccentric respectively, said driven element thereby being rotated at the same speed as said annular element when concentric, and connections between said shaft and said bearing member to gyrate the same whereby the speed of rotation of said driven element may be varied to an extent dependent upon the degree of eccentricity of said bearing member.

7. Speed varying mechanism comprising in combination a shaft, an annular element rotatably connected therewith, a bearing member adjustable eccentrically of said annular element, a driven element concentric and rotatable upon said bearing member, a series of driving units intermediate said annular and driven elements, connected with one and operatively engageable continuously or progressively with the other as said bearing member is concentric or eccentric respectively, said driven element thereby being rotated at the same speed as said annular element when concentric, and connections between said shaft and said bearing member to gyrate the same whereby the speed of rotation of said driven element may be varied to an extent dependent upon the degree of eccentricity of said bearing member, said connections including means to render inoperative any driving units which would tend to rotate said driven element reversely.

8. Variable speed transmission mechanism comprising in combination rotatable driving and driven elements the axes of which are relatively adjustable eccentrically, a circumferential series of driving units intermediate said elements and connected with one and positively engageable with the other to cause said elements to rotate in unison when mutually concentric, and means to gyrate said driven element when relatively eccentric thereby to vary its rotary speed.

9. Variable speed transmission mechanism comprising in combination rotatable driving and driven elements the axes of which are relatively adjustable eccentrically, a circumferential series of driving units intermediate said elements and connected with one and positively engageable with the other to cause said elements to rotate in unison when mutually concentric, and means to gyrate said driven element when relatively eccentric thereby to vary its rotary speed, the variation being proportionate to the eccentricity.

10. Variable speed transmission mechanism of universal adjustability comprising rotatable driving and driven elements relatively adjustable eccentrically, driving means intermediate the same, and means to gyrate one element about the axis of the other when eccentric thereto and in the direction of and during the rotation of said driving element thereby to decrease the rotary speed imparted to the driven element.

11. Variable speed transmission mechanism of universal adjustability comprising rotatable driving and driven elements relatively adjustable eccentrically, driving means intermediate the same, and means to gyrate one element about the axis of the other when eccentric thereto and in the direction of and during the rotation of said driving element thereby to decrease the rotary speed imparted to the driven element, said driving and driven elements rotating in unison when concentric.

12. Variable speed transmission mechanism comprising in combination rotatable driving and driven elements relatively eccentrically adjustable, the eccentric element being also gyratable in the direction of rotation of said elements, and positive driving means operatively connecting said elements whereby said elements are rotated in unison when concentric but when relatively eccentric the driven element receives a reduced speed.

13. Variable speed transmission mechanism comprising in combination rotatable driving and driven elements relatively eccentrically adjustable, the eccentric element being also gyratable in the direction of rotation of said elements, and positive driving means operatively connecting said elements whereby said elements are rotated in unison when concentric but when relatively eccentric the driven element receives a reduced speed, the resultant speed being zero when said relative eccentricity is at the maximum.

14. Variable speed transmission means comprising in combination rotatable driving and driven elements 20 and 37, eccentrically adjustable means 36 to gyrate said driven element, driving units 38—45 connected to said driven element and circumferentially engageable with said driving element, the rotation of the driving element and the gyration of the driven element being in the same direction and so relatively proportioned that the resulting speed of the driven element is less than that of the driving element to an extent corresponding to the degree of eccentricity of said adjustable means, and means including the cam 64 to prevent any driving units from operating to rotate said driven element reversely.

15. Variable speed transmission mechanism comprising in combination rotatable driving and driven elements the axes of which are relatively adjustable eccentrically, a circumferential series of driving units intermediate said elements and connected with one and positively engageable with the other to cause said elements to rotate in unison when mutually concentric, and to cause the driven element to rotate at a speed differing from that of the driving element when said elements are relatively eccentric, and means to gyrate said driven element when relatively eccentric thereby to vary its rotary speed.

In testimony whereof, I have signed my name to this specification.

BICKNELL HALL.